United States Patent
Deucker et al.

[11] 4,062,642
[45] Dec. 13, 1977

[54] PROCESS FOR DYEING AND PRINTING SYNTHETIC FIBER MATERIALS

[75] Inventors: Walter Deucker, Neuenhain, Taunus; Rudolf Löwenfeld, Buchschlag, both of Germany

[73] Assignee: Hoechst Aktiengesellschaft, Frankfurt am Main, Germany

[21] Appl. No.: 691,846

[22] Filed: June 1, 1976

[30] Foreign Application Priority Data

June 3, 1975 Germany .............................. 2524481

[51] Int. Cl.$^2$ .......................... D06P 1/38; C09B 29/36
[52] U.S. Cl. ........................................ 8/1 UA; 8/1 L; 8/21 C; 8/41 C; 8/179; 260/158; 8/1 T; 8/41 R; 8/41 B; 8/94 A; 260/192
[58] Field of Search ................... 260/158; 8/1 T, 1 L, 8/1.2, 1 UA, 41 C, 41 B, 94 A, 41 L

[56] References Cited

U.S. PATENT DOCUMENTS 3,455,898   7/1969   Seefelder et al. .................... 260/158

*Primary Examiner*—A. Lionel Clingman
*Attorney, Agent, or Firm*—Curtis, Morris & Safford

[57] ABSTRACT

Process for the dyeing and printing of synthetic fibrous materials, wherein the said fibrous materials are treated with an aqueous dispersion, an aqueous padding liquor or with a solution in an organic solvent of at least one dyestuff of the formula

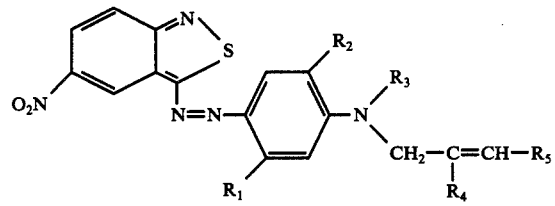

in which $R_1$ represents hydrogen, chlorine, lower alkyl or —NH—CO-lower alkyl, $R_2$ represents hydrogen, lower alkyl or lower alkoxy, $R_3$ represents lower alkyl, lower alkylene-OH, lower alkylene-CN, —CH$_2$—CBr=CH$_2$,

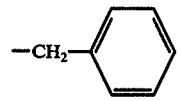

or lower alkylene-COO-lower alkyl, $R_4$ represents hydrogen, bromine or lower alkyl, and $R_5$ represents hydrogen, lower alkyl or phenyl, this process yielding violet to bluish-green, preferably reddish to greenish dark blue dyeings and prints of high tinctorial strength and excellent fastness properties on the said fibrous material, such as fibers of linear polyesters, cellulose esters and polyamides.

7 Claims, No Drawings

PROCESS FOR DYEING AND PRINTING SYNTHETIC FIBER MATERIALS

The present invention relates to a process for dyeing and printing synthetic fiber materials.

It was found that valuable dyeings and prints can be obtained on synthetic fiber materials when these materials are treated with an aqueous dispersion, and aqueous padding liquor or an organic solution of at least one of the dyestuffs of the formula (1)

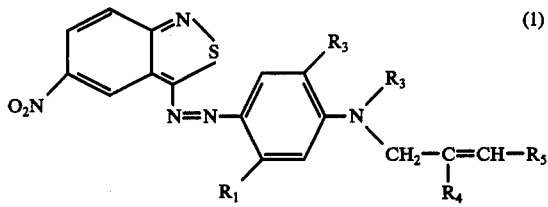

wherein $R_1$ represents hydrogen, chlorine, lower alkyl or —NH—CO—lower alkyl, $R_2$ represents hydrogen, lower alkyl or lower alkoxy, $R_3$ represents lower alkyl, lower alkylene—OH, lower alkylene—CN, —CH$_2$—CBr=CH$_2$,

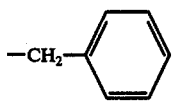

or lower alkylene—COO—lower alkyl, $R_4$ represents hydrogen, bromine or lower alkyl, and $R_5$ represents hydrogen, lower alkyl or phenyl.

Especially valuable dyeings and prints are obtained when dyestuffs are used which correspond to the formula (2)

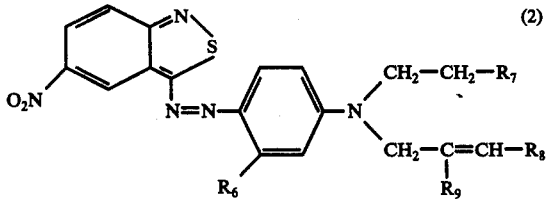

wherein $R_6$ and $R_8$, independent of one another, each is a hydrogen atom or a methyl group, $R_7$ is a hydrogen atom or the hydroxyl group and $R_9$ is a hydrogen atom or a bromine atom or the methyl group.

The dyestuffs may also be used in mixture with one another or with other dyestuffs.

The dyestuffs used in accordance with the invention are prepared in a manner known in principle by dissolving the diazo component of the formula (3)

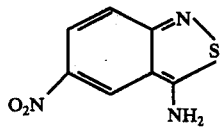

for example in a mixture of glacial acetic acid and propionic acid and/or concentrated sulfuric acid, diazotizing with the addition of solid sodium nitrite or nitrosylsulfuric acid and coupling with an azo component of the general formula (4)

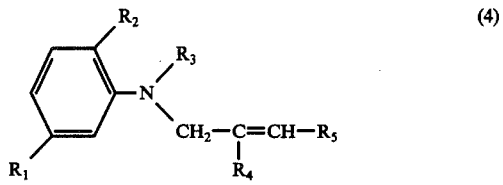

wherein $R_1$, $R_2$, $R_3$, $R_4$ and $R_5$ are defined as above, in a solution or suspension of mineral acid, acetic acid or a weak acid buffer.

The coupling components especially preferred in the preparation of the dyestuffs used in accordance with the invention are those of the formula (5)

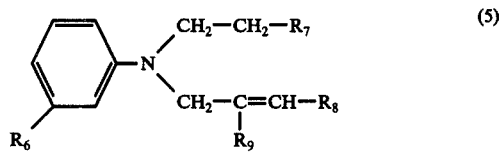

wherein $R_6$, $R_7$, $R_8$ and $R_9$ are defined as hereinbefore.

Suitable synthetic fiber materials are, for example, those made of cellulose esters, polyesters, polyamides, polyolefins, polyurathanes and polyacrylonitriles, among which are especially preferred those made of cellulose acetate, cellulose triacetate, polyamides, such as poly-ε-capro-lactam, and of polyesters, such as polyethylene terephthalate. The synthetic fiber materials may also be present in mixtures with one another or with natural fiber materials, such as cellulose fibers, or wool. Moreover, they may be in the form of various processing states, for example, as combed material, flocks, threads, wovens or knits.

The dyestuffs to be used in accordance with the invention are applied in a manner known in principle, generally from aqueous dispersions, but also from organic solvents. The dyestuffs may be dispersed, for example, by grinding in the presence of a dispersing agent, for example, a condensation product of formaldehyde and a naphthalenesulfonic acid.

For the rest, the dyeing conditions largely depend on the nature of the synthetic fiber materials to be dyed or printed and on their processing state.

For example, shaped articles made of cellulose acetate are dyed within a temperature range of from 75° to 85° C. Cellulose triacetate fibers are dyed at temperatures ranging from about 90° to 125° C.

The dyestuffs are applied to polyamide fiber materials within a range of temperature of about 90° to 120° C. Fiber materials of polyesters are dyed according to the known methods. This material is dyed in the presence of carriers, for example, o- or p-phenylphenol, methylnaphthalene or methylsalicylate at temperatures of about 100° C or without the use of carriers at correspondingly higher temperatures, for example, between 120° and 140° C. According to the process of the invention, the dyestuffs may also be applied by pad-dyeing with or without thickening agent, for example, a tragacanth thickening, to the fiber materials mentioned or fixed by the action of heat, for example, by vapor or dry heat during about a half to 30 minutes at temperatures within the range of from about 100° to 230° C. To improve the purity, the material so dyed is advantageously freed from dyestuff sticking to the surface, for example, by rinsing or a reductive purification.

The reductive after-treatment is carried out generally at 60° to 120° C in an aqueous sodium hydroxide solution, sodium dithionite and a non-ionic detergent, for example, a liquor containing addition product of ethylene oxide and phenol.

Synthetic fiber materials are dyed from organic solvents, for example, by allowing the dyestuff to penetrate the fiber from the solution at room temperature or above, preferably at about 70° to 130° C, optionally under pressure, or by continuously impregnating wovens or knits with a dyestuff solution, drying and treating with heat for a short time, for example, at 180° to 210° C. For the exhaustion method, there may be considered, for example, solvents which are not miscible with water and have boiling points within the range of from 40° to 170° C, for example, the aliphatic halohydrocarbons, such as methylene chloride, trichloroethane, trichloroethylene, perchloroethylene or trifluorotrichloroethane. Especially for a continuous dyeing method, there may be considered solvents miscible with water, for example, alcohols or dimethyl formamide. The solvents may also be used as mixtures and may contain further auxiliaries soluble in solvents, for example, oxalkylation products of fatty alcohols, alkyl phenols and fatty acids.

For the preparation of prints on synthetic fiber materials, for example, made polyesters, polyamides or cellulose triacetate, the dye-stuffs of the invention may be used in the form of water-containing preparations which may contain suitable thickening agents and fixation accelerators in addition to the finely dispersed dyestuff. The fixation is carried out, for example, after printing and drying by steaming under atmospheric pressure or under elevated pressure up to 2.5 atmg during 10 to 60 minutes. The action of air heated to 160° to 210° C during 30 seconds to 10 minutes may also realize fixation.

The dyestuffs to be used according to the invention yield violet to bluish green, preferably reddish to greenish dark blue dyeings and prints of high color intensity and having excellent fastness properties.

The dyeings and prints obtained according to the process of the invention are especially distinguished by very high dyestuff yields and very good fastnesses to light and to sublimation. Compared to dyeings obtained with dyestuffs of comparable structure disclosed in German Offenlegungsschrift No. 1,544,375, the dyeings obtained according to the invention, for example, on blends of polyester and wool at dyeing temperatures of 100° C or 106° C with the addition of carriers show a distinctly better color build-up and a considerably higher dyestuff yield. When dyed at dyeing temperatures of 120° C without the addition of carriers, the dyestuffs of the invention show a better absorption capacity and an improved build-up, for example, on pure polyester material.

The following Examples illustrate the invention, the parts and percentages being by weight unless stated otherwise. The ratio of parts by weight to parts by volume is that of the kilogram to the liter under normal conditions.

EXAMPLE 1

10 Parts of a polyester fabric were added to a dyebath heated to 50° C and consisting of 400 parts of softened water and 0.2 part of the dyestuff of the formula

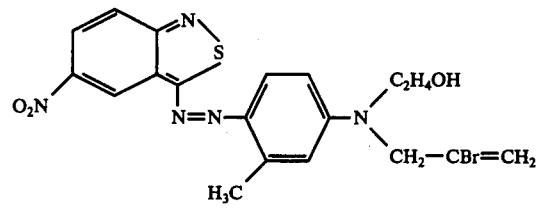

in finely dispersed form.

The pH of the dyebath was adjusted to 4.5 to 5 by means of ammonium sulfate and acetic acid. The temperature was raised to 130° C during 40 to 60 minutes. Dyeing was effected at that temperature during an hour.

The fabric was taken out, rinsed with water and reductively purified at 80° to 90° C during 20 minutes in a bath that contained per liter 4 g of sodium dithionite, 6 ml of sodium hydroxide solution of 32.5% strength and 3 g of non-ionic detergent. The dyed fabric was rinsed and dried.

A reddish dark blue dyeing was obtained having a very high color intensity and excellent fastness properties.

Similar results are obtained when instead of a polyester fabric a triacetate fabric was used and dyeing was effected at a temperature of 110° C.

The dyestuff of the above formula may be obtained as follows:

9.75 Parts of 5-nitro-3-amino-2,1-benzisothiazole were dissolved at 10° to 15° C in 120 parts of sulfuric acid of 95% strength. 50 parts of glacial acetic acid were added and 14.2 parts of nitrosylsulfuric acid of 46.5% were added slowly and dropwise at 0° to 5° C. Diazotization was completed by stirring for another 2 hours.

13.5 Parts of N-β-hydroxyethyl-N-β-bromopropene-m-toluidine wera dissolved in 30 parts of hydrochloric acid (37%). 500 parts of water and 500 parts of ice were added to the solution to which the diazonium solution was added. The temperature was maintained at 0° to 5° C by adding ice. The pH was adjusted to 4 by means of 450 parts of sodium acetate in crystalline form and the solution was stirred for another 2 hours. Then, the precipitated dyestuff was suction-filtered and washed with water until neutral and free of salt. The filter cake so obtained was finely dispersed either in the moist or in the dry state by means of commercial dispersing agents, such as a condensation product of formaldehyde and a naphthalenesulfonic acid.

EXAMPLE 2

10 Parts of polyester yarn were introduced into a dyebath heated to 60° C which consisted of 300 parts of softened water, 0.3 parts of finely dispersed dyestuff of the formula

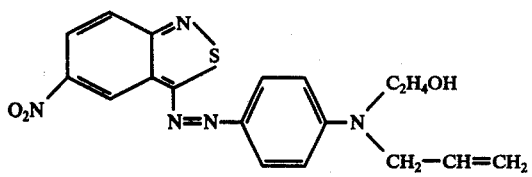

1 part of commercial carrier, such as o-phenylphenol and 0.5 part of ammonium sulfate.

The pH of the dyebath was adjusted to 4.5 to 5 by means of the acetic acid. The temperature was raised to the boiling point within 30 to 60 minutes and dyeing was effected at that temperature during 90 minutes.

As described in Example 1, the dyed material was purified afterwards and finished.

In this manner, intense, dark blue dyeings were obtained having very good fastness properties and a high dyestuff yield.

The dyestuff mentioned in this Example can be prepared as described in Example 1, when the coupling component are 8.9 parts of N-β-hydroxyethyl-N-allyl-aniline.

EXAMPLE 3

A blended fabric of polyester and cellulose was impregnated at 25° to 30° C with a dyebath containing 10 parts per liter of the finely dispersed dyestuff of the formula

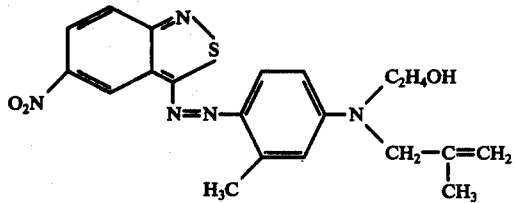

and having a pH adjusted to 4.5 by means of acetic acid.

The material was dried at temperatures within the range of 100° and 110° C. The dyestuff was fixed by means of dry heat during 30 to 90 seconds at 190° to 230° C. Then, the material was after-treated reductively and finished as described in Example 1.

An intense dark blue dyeing was obtained having excellent fastness properties, especially an excellent fastness to sublimation and a very good fastness to light.

Similar highly valuable dyeings aere obtained when triacetate fiber materials were dyed in the manner described.

The dyestuff of this example was obtained, as described in Example 1, when the coupling component used was 10.3 parts of N-β-hydroxyethyl-N-2-methyl-allyl-m-toluidine.

EXAMPLE 4

A polyester fabric was printed with a printing paste that contained per 1,000 parts beside a commercial thickening agent, such as alginate or starch ether, and other usual additives, 200 parts of an aqueous dyestuff preparation having a content of 10% of the finely dispersed dyestuff of the formula

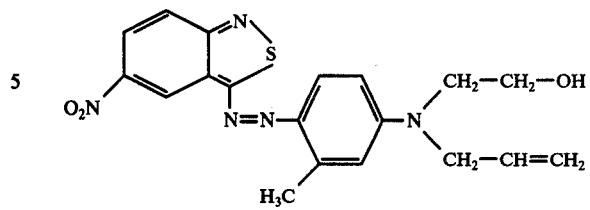

Then, the material was dried.

The dyestuff was fixed at 200° C during 60 seconds by means of hot air. The print was rinsed, purified reductively in a bath that contained sodium dithionite and sodium hydroxide solution, purified again in another bath that contained a non-ionic detergent, such as the condensation product of nonyl phenol and 10 mols of ethylene oxide, rinsed again and dried.

A dark blue print was obtained which had a high color intensity and excellent fastness properties, especially a very good fastness to thermo-fixation. Similar good results were obtained when the fixation was carried out during 20 minutes by means of pressurized steam of 2 atmg.

When instead of the polyester fabric a fabric of triacetate fibers was used, without purifying reductively, prints of a high color intensity and very good results were also obtained.

The dyestuff was obtained, as described in Example 1, when the coupling component used was 9.6 parts of N-β-hydroxyethyl-N-allyl-m-toluidine.

EXAMPLE 5

A polyester fabric was impregnated with a solution that has been prepared from 1,600 parts of perchloroethylene and 5 parts of the dyestuff of Example 2 at 40° C, with a liquor pick-up of 80% and dried. The dyestuff was fixed at 220° C during 60 seconds, then the dyeing was washed cold in perchloroethylene.

An intense dark blue dyeing was obtained which had very good processing properties.

EXAMPLE 6

A fabric made of polyester fibers was printed with a printing paste according to Example 4, that contained the dyestuff of the formula

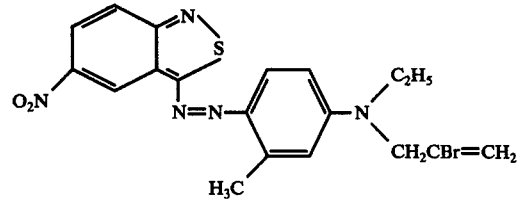

and dried.

The dyestuff was fixed by steaming with steam of 1.5 atmg during 30 minutes. After purifying and drying a reddish dark blue print was obtained having a high color intensity and good fastness properties. Valuable prints were also obtained when instead of a fabric made of polyester fibers a fabric of acetate fibers was used.

The dyestuff of this Example was obtained as described in Example 1 when the coupling component used was 12.6 parts of N-ethyl-N-bromopropenyl-m-toluidine.

EXAMPLE 7

A fabric made of polyamide fibers was printed with a printing paste according to Example 4, which contained the dyestuff of Example 2, and dried. The dyestuff was fixed by steaming without over-pressure during 20 minutes. The print was rinsed with water, purified again in a bath that contained a non-ionic detergent, rinsed again and dried. A dark blue print was obtained which had a high color intensity and very good fastness properties.

The following Table gives a list of further dyestuffs of the general formula (1)

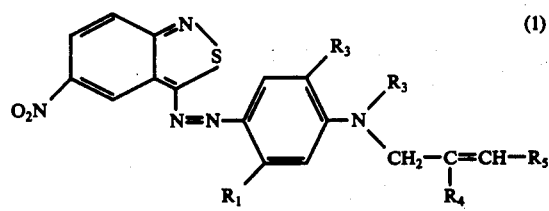

(1)

that were used in accordance with the invention.

| Example No. | $R_1$ | $R_2$ | $R_3$ | $R_4$ | $R_5$ | Shade on polyester fibers |
|---|---|---|---|---|---|---|
| 7 | H | H | —$C_2H_5$ | Br | H | reddish blue |
| 8 | H | H | —$C_2H_4OH$ | $CH_3$ | H | dark blue |
| 9 | H | H | —$C_2H_4CO_2C_2H_5$ | Br | H | violet |
| 10 | H | H | —$C_2H_5$ | H | H | dark blue |
| 11 | H | H | —$C_2H_4CO_2CH_3$ | H | H | reddish blue |
| 12 | $CH_3$ | H | —$C_2H_4CN$ | H | H | violet |
| 13 | $CH_3$ | H | —$C_2H_4CO_2CH_3$ | H | H | dark blue |
| 14 | $CH_3$ | $CH_3$ | —$CH_3$ | H | H | grey blue |
| 15 | $NHCOCH_3$ | H | —$C_2H_4CO_2CH_3$ | H | H | greenish blue |
| 16 | $NHCOC_2H_5$ | H | —$C_2H_4OH$ | H | H | greenish blue |
| 17 | $NHCOCH_3$ | $OCH_3$ | —$C_2H_5$ | H | H | bluish green |
| 18 | H | H | —$C_2H_4CO_2CH_3$ | $CH_3$ | H | reddish blue |
| 19 | H | H | —$CH_2$—$C_6H_5$ | $CH_3$ | H | blue violet |
| 20 | $CH_3$ | H | —$C_2H_5$ | $CH_3$ | H | dark blue |
| 21 | Cl | H | —$C_2H_4OH$ | H | H | dark blue |
| 22 | H | H | —$C_2H_4OH$ | H | $C_6H_5$ | dark blue |
| 23 | H | H | —$CH_2$—$CBr=CH_2$ | Br | H | red violet |
| 24 | H | H | —$C_2H_5$ | H | $CH_3$ | dark blue |
| 25 | $CH_3$ | H | —$C_2H_4OH$ | H | $CH_3$ | dark blue |

We claim:

1. Process for the dyeing and printing of synthetic fibrous materials, wherein the said fibrous materials are treated with an aqueous dispersion, an aqueous padding liquor or with a solution in an organic solvent of at least one dyestuff of the formula

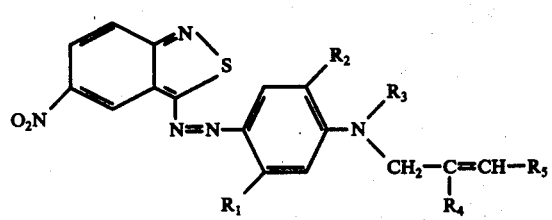

in which $R_1$ represents hydrogen, chlorine, lower alkyl or —NH—CO—lower alkyl, $R_2$ represents hydrogen, lower alkyl or lower alkoxy, $R_3$ represents lower alkyl, lower alkylene—OH, lower-alkylene—CN, —$CH_2$—$CBr=CH_2$,

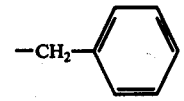

or lower-alkylene—COO—lower alkyl, $R_4$ represents hydrogen, bromine or lower alkyl, and $R_5$ represents hydrogen, lower alkyl or phenyl.

2. Process as claimed in claim 1, wherein fibrous materials consisting of linear polyesters, cellulose esters or of polyamides are treated as synthetic fibrous materials.

3. Process as claimed in claim 1, wherein fibrous materials consisting of a linear polyester are dyed with an aqueous dispersion of at least one dyestuff of the said formula in the absence of a carrier at a temperature between about 120° and 140° C, or in the presence of a carrier at about 100° C.

4. Process as claimed in claim 1, wherein synthetic fibrous materials consisting of cellulose esters are dyed with an aqueous dispersion of at least one dyestuff of the said formula at a temperature between about 75° and 125° C.

5. Process as claimed in claim 1, wherein fibrous materials consisting of polyamides are dyed with an aqueous dispersion of at least one dyestuff of the said formula between about 90° and 120° C.

6. Process as claimed in claim 1, wherein synthetic fibrous materials consisting of linear polyesters, cellulose esters or polyamides are dyed by padding with an aqueous padding liquor containing at least one dyestuff of the said formula and subsequently fixing the dyestuff by exposing to dry heat or by steaming each at a temperature between about 100° and 230° C.

7. Process as claimed in claim 1, wherein synthetic fibrous materials consisting of linear polyesters, cellulose esters or polyamides are
    a. dyed from an organic dye-bath containing at least one dyestuff of the said formula at a temperature between room temperature and about 130° C according to the exhaust process or
    b. impregnated with the said organic dye-bath, dried and subsequently exposed to a short dry heat at a temperature between 180° and 210° C.

* * * * *